April 22, 1941. J. L. KIMBALL Re. 21,777

PRESSURE AND TEMPERATURE CONTROL SWITCH

Original Filed Oct. 12, 1932 2 Sheets-Sheet 1

INVENTOR.
James L. Kimball

PRESSURE AND TEMPERATURE CONTROL SWITCH

Original Filed Oct. 12, 1932 2 Sheets-Sheet 2

INVENTOR.

James L. Kimball

Reissued Apr. 22, 1941

Re. 21,777

UNITED STATES PATENT OFFICE 21,777

PRESSURE AND TEMPERATURE CONTROL SWITCH

James Lewis Kimball, Danvers, Mass., assignor to Ruggles-Klingemann Mfg. Co., Salem, Mass.

Original No. 1,975,851, dated October 9, 1934, Serial No. 637,466, October 12, 1932. Application for reissue January 28, 1936, Serial No. 62,160

19 Claims. (Cl. 236—74)

My invention relates to pressure and temperature control apparatus, in which an electrically reversible motor is included as the operating means for controlling the position and movement of a valve, or like device, used in the control of pressure or temperature, or a combination of both pressure and temperature.

One of the objects of my invention is to so control the motor as to prevent a condition of over correction and hunting action due to time lag.

A second object is to provide means whereby the motor is controlled primarily from pressure, but to modulate the pressure setting from variations in the temperature of the fluid to be controlled. This last named object is particularly advantageous in the control of pressure in steam heating of rooms, in that the pressure of the steam used to heat the room is reduced as the temperature increases.

Another object of the invention is to primarily control from temperature, but to modify the setting of the thermo-sensitive element from variations in pressure thus avoiding excessive steam pressure in the heating apparatus before the space to be heated is brought up to the required temperature. Such an arrangement has a decided advantage in installations where the control valve is bleeding steam for heating purposes from a high pressure source.

Figure 1:
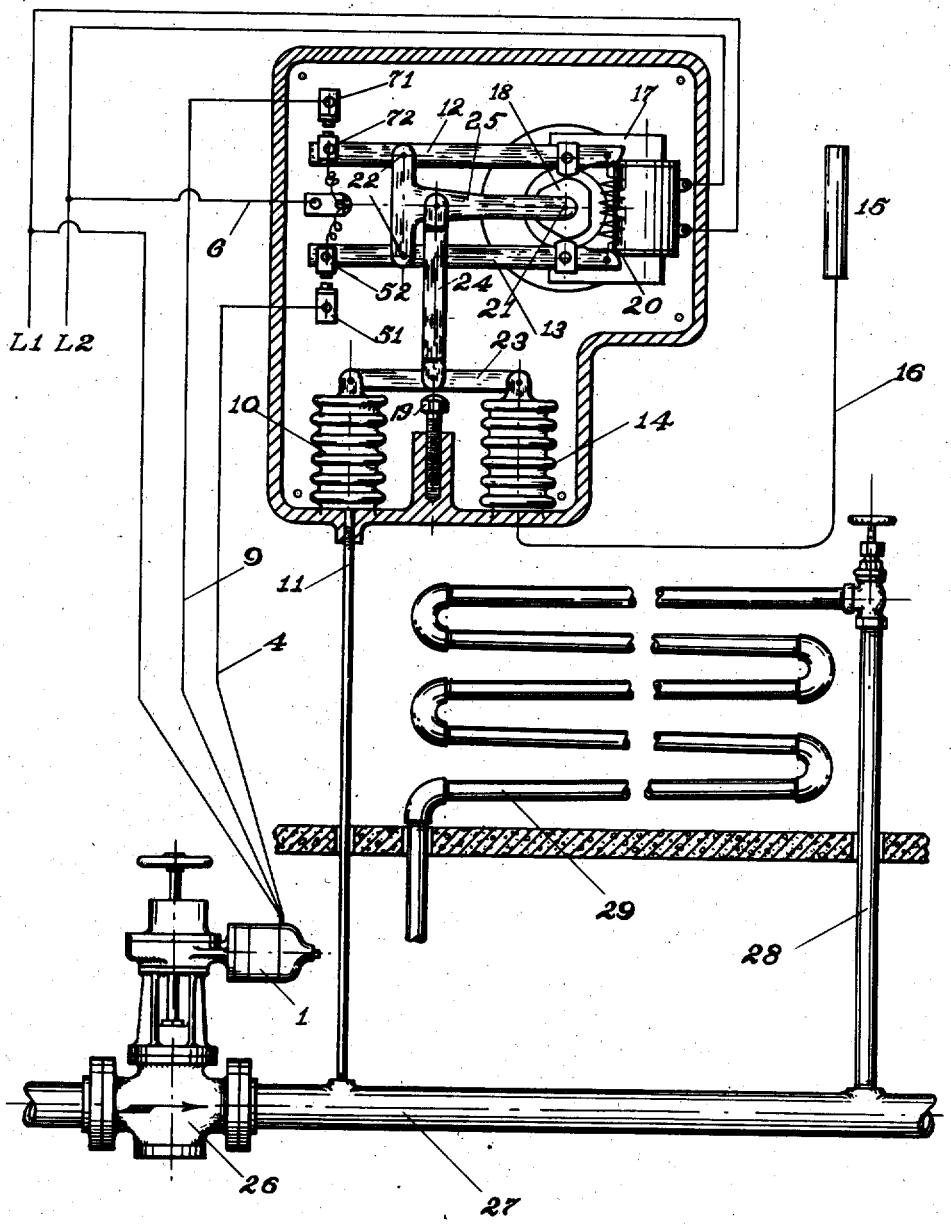
Figure 2:
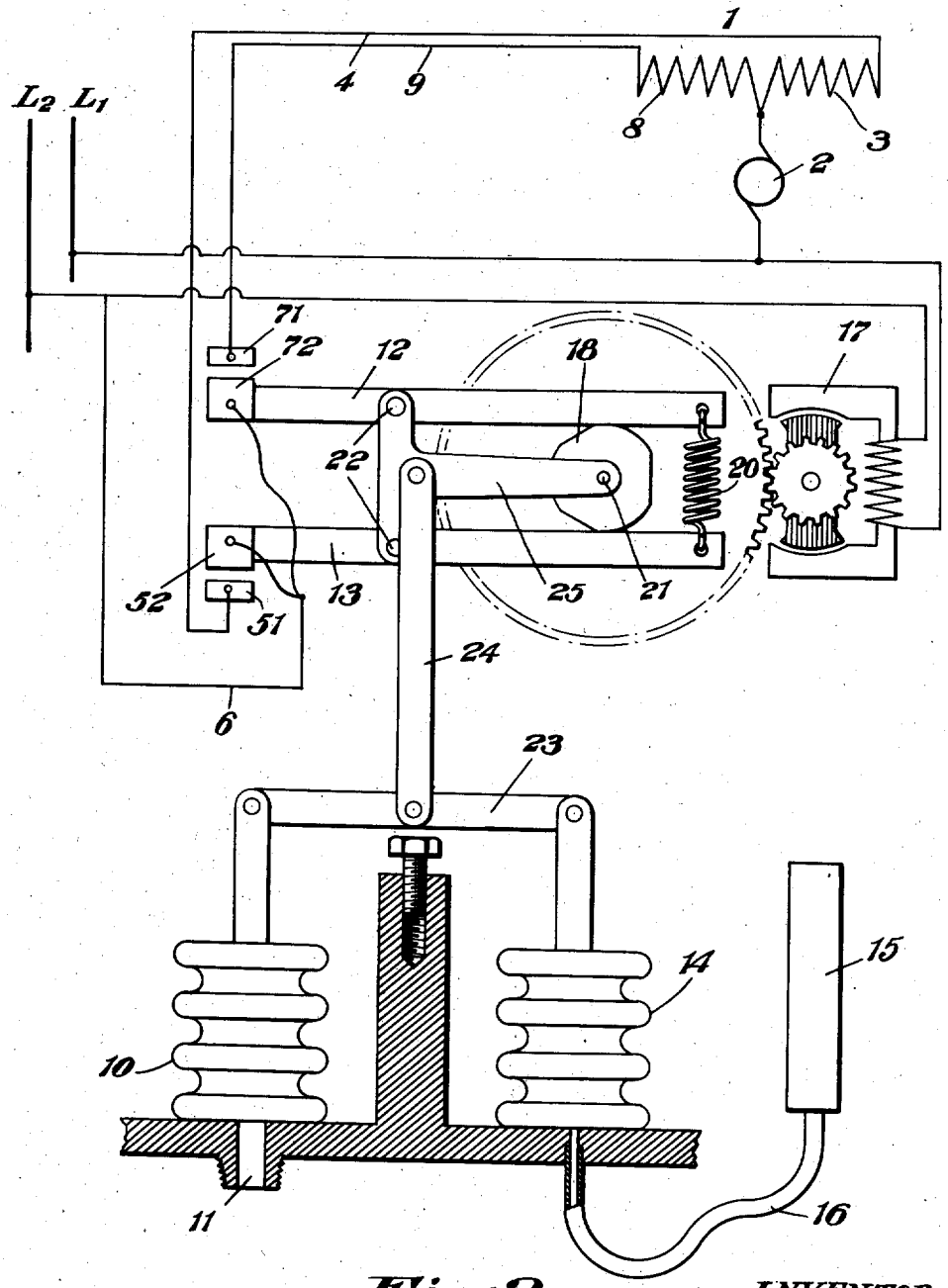

To carry out the objects of my invention, the various elements are associated as illustrated in the accompanying drawings in which Fig. 1 illustrates a schematic drawing showing a heat control system as one embodiment of my invention and Fig. 2 a diagrammatic drawing of the control circuit for operating the heat controlling means.

The drawings show a vertical elevation of my invention in which two switch arms 12 and 13 having contact members 52 and 72 are reciprocated between two stationary contacts 51 and 71 by means of a cam 18 operated by a timing motor 17. The switch arms 12 and 13 are pivoted on a device which is responsive to a condition such as variation in pressure or temperature and constitutes a floating switch element arranged to intermittently control a motor circuit as hereafter described.

An electrically reversible motor, for controlling the position and movement of a valve, or like device 26 (Fig. 1) for regulating the pressure and temperature is represented by 1, this motor controls valve 26 to supply steam from a high pressure source to the heating main 27 and thence through riser 28 to the heating coil 29. Referring now to Fig. 2. Current flows from main line $L^1$ through armature 2 and field coil 3, thence through conductor 4 and switch contact points 51 and 52 when said contacts are closed back to line $L^2$ through conductor 6 effecting rotation of the motor in one direction. When contacts 71 and 72 are closed, current flows from $L^1$ through armature 2 and field coil 8, thence through conductors 9 and 6 back to $L^2$ effecting operation of the motor in the opposite direction. It will be understood that the arrangement of motor circuit can be varied as required, for motors and motor circuits of varying characteristics in carrying out the purpose of my invention.

A flexible bellows or diaphragm device, responsive to variations in pressure, is shown at 10, pressure connection being at 11. This device is intended to actuate switch arms 12 and 13 through the connections shown. A temperature responsive device is shown at 14, having temperature bulb 15 and flexible connecting tube 16. This thermostatic control is also intended to control the operation of switch arms 12 and 13, but from variations in temperature, it will be understood that either the pressure or temperature responsive device can control the switch arms independently, or they can control the switch arms jointly as the pressure of the fluid, or the temperature of the room may require. An increase in pressure will close contact points 71 and 72 to operate motor 1 in the proper direction to close off the fluid pressure, and likewise an increase in temperature of the room will close these same contact points to operate the motor to retard the flow of fluid pressure. It will be understood that there will be some time lag between the time the motor is operated and the time the change in pressure setting becomes effective at the pressure responsive devices, and for this reason it is desirable to operate the motor under normal changes in the condition of the fluid intermittently with a well defined period of rest between periods of operation. The object being to allow the result of the adjustment of the motor to become effective at the pressure device before proceeding to a further operation. Likewise in temperature control systems the time lag is even greater and consequently requires longer periods of rest between periods of adjustment in order that the heat supply may become effective at the thermostat before a second adjustment takes place. For this purpose, I have provided a continuous operating timing motor 17 so arranged as to operate a cam 18. The purpose of this timing motor is to intermittently, and at predetermined periods, reciprocate the switch arms 12 and 13 to see if there has been any change in the condition of the pressure or temperature, and if so, make contact and adjust the motor accordingly. Ordinarily, with pressure and temperature at its normal value, contacts are not made by the reciprocating of these contact arms by the cam 18, but should there be any variation from neutral position of these arms, through variations in pressure or temperature, then contact will be made and the proper adjustment of the motor made to correct conditions.

It should be understood that the cycling period of the cam 18 and the number of steps in a cycling period should be varied in accordance with the degree of transfer lag present. When the control is primarily from pressure, then the cycling operation must be relatively rapid in order to avoid building up excessive pressure between adjustment periods which would otherwise cause hunting action. On the other hand, where the control is primarily from temperature, a much slower cycling operation is desirable.

In the operation of my invention, a stop screw 19 is provided, which can be so adjusted as to prevent the contact arm 13 from dropping to a position where a continuous operation is possible. Or, in other words, the operation of the motor will be in steps of operation, regardless of how low the pressure or temperature may be. On the other hand, should there be a sudden rise in either pressure or temperature, the motor can be operated continuously until normal conditions are restored. It will be understood that the switch arms 12 and 13 are made of non-conducting electric insulating material, and that the spring holds these strips in contact with the face of the cam 18.

With the adjustment of the contact arms 12 and 13, from either pressure or temperature, the pivot point is at 21, but when reciprocated by the cam 18, the pivot points are at 22. The floating lever 23 and connecting arm 24 provide the necessary means for operating arm 25 and the contact arms 12 and 13.

In the operation of my invention, I will assume that the application is to steam pressure control for heating a room, and that under the most severe temperature conditions I will say a 5 lb. pressure is required to bring up the temperature of the room in the shortest possible time. Now, as the room approaches the required temperature, the thermostatic element which is subject to the temperature of the room, becomes effective, and through the expansion of the fluid within the bulb 15 causes the bellows 14 to expand and thereby operate the motor 1 to cut off the steam supply and consequently reduce the pressure setting of the pressure device 10. Likewise, as the room becomes cold, the thermostatic element contracts and thereby increases the pressure setting of the pressure device.

To this novel feature is added the timing motor to insure step operation of the motor 1, and thereby prevent a condition of over correction and consequent hunting action due to time lag in the pressure system.

In this application it will be seen that my invention will not only control the pressure, but also the temperature within the required limits, but will result in increased steam economy by preventing over heating.

While I have described the application of my invention, as to steam heating control, the same will be found to be of advantage in other applications. Therefore, my invention is not limited, except by the scope of the appended claims.

I claim:

1. In a pressure controlled switch the combination of a circuit making and breaking switch having high and low pressure contacts, and two parallel floating switch contact arms, a connecting link properly spacing said floating contact arms between the high and low pressure contacts, a pressure responsive device pivoted on said link, and means to alternately reciprocate said arms at predetermined intervals to cause intermittent contact at either the high or low pressure position when the pressure on the pressure responsive device varies from normal.

2. In a pressure controlled switch the combination of a circuit making and breaking switch having high and low pressure contacts, and two parallel floating switch contact arms, a connecting link properly spacing said floating contact arms between the high and low pressure contacts, a pressure responsive device pivoted on said link, means to alternately reciprocate said arms including a motor driven cam, and means due to a variation of pressure from normal acting on the pressure responsive device for intermittently contacting at either the high or low contact position.

3. In a pressure controlled switch comprising two parallel movable switch arms having contact points at one end, stationary contacts above and below the movable contacts, a connecting link properly spacing said movable switch arms intermediate of the stationary contacts, a pressure responsive device pivoted on said link, a motor driven cam located at the opposite end and between said movable switch arms, means to hold said switch arms in contact with the face of said cam, and arranged to reciprocate said arms by the rotating of said cam without making contact at either of said stationary points when the pressure acting on the pressure responsive device is at normal, and for making intermittent contact with either one or the other stationary contacts when the pressure is respectively above or below normal.

4. In a switch for the regulation of a condition, comprising a floating switch member operated between two stationary contacts and arranged to be reciprocated by a motor operated cam without making contact at either of said stationary contacts when said switch member is in a central position between said contacts, and a device sensitive to variations in said condition pivoted on said switch member and arranged to move said switch member out of its central position on a variation from normal in said condition, permitting intermittent contact at either one or the other of said stationary contacts, and means controlled by said switch for maintaining said condition at a substantially uniform value.

5. In a control switch for the regulation of a condition, comprising two stationary contact points, a floating switch member arranged to engage said contact points, a device responsive to variations in said condition pivoted on said floating switch member, means to oscillate said floating switch member on said pivot without engaging said stationary contacts when the device responsive to said condition is in its mid-position and for intermittently contacting at either one or the other of said stationary contact points, when variations in said condition moves said sensitive device out of its mid position, and means controlled by said switch for maintaining said condition at a substantially uniform value.

6. In a switch for the regulation of a condition, comprising two stationary reversing contacts, moveable contacts arranged to engage said stationary contacts under predetermined conditions, a floating switch member supporting said moveable contacts, a device responsive to variations in said condition pivoted on said floating switch member, means to periodically oscillate said floating switch member without engaging the stationary contacts when said condition is at normal, and for intermittently contacting at either one or the other stationary contacts on variations from the mean average value of said condition, and means controlled by said switch for maintaining said condition at a substantially uniform value.

7. In a switch for the regulation of a condition comprising a floating switch member having circuit making and breaking contacts at one position, stationary contacts arranged to be engaged by the moveable contacts when the switch member is moved out of a neutral position, a device responsive to variations in said condition pivoted on said floating switch member at a second position, a motor and means operated thereby for reciprocating said floating switch member on said pivot without making contact at either stationary contact position when the floating switch member is in its neutral position, and for intermittently contacting at the stationary contacts at pre-determined intervals when said responsive device moves said switch member out of its neutral position, and means operated by said switch for maintaining said condition at a substantially uniform value.

8. In a pressure system, a motor for controlling the pressure in the system, a switch for controlling the motor, having a neutral position in which it is normally ineffective, and two normally effective positions for controlling the operation of the motor in one or another direction, a device responsive to variations in pressure in the system arranged to operate said switch to either of its effective positions, a second motor co-operating with said pressure device and arranged to periodically reciprocate said switch without operating the first named motor when said pressure device is in a neutral position, and for intermittently operating the first named motor in either one or another direction when said pressure responsive device is moved out of its neutral position.

9. In a pressure system, a motor for controlling the pressure in the system, a switch for controlling the motor having a neutral position in which it is normally ineffective, and two normally effective positions for controlling the operation of the motor in one or another direction, a device responsive to the pressure in the system pivoted on said switch and arranged to effect its operation to either of its effective positions, means to periodically oscillate said switch on said pivot without effecting the operation of said motor when said switch is in its normally ineffective position, and for intermittently operating said motor in either one or another direction when said pressure responsive device is moved out of its normally ineffective position.

10. In a pressure controlled switch, comprising a floating switch contact member, a pressure responsive device pivoted on said switch, a timing motor co-operating with said pressure device and arranged to reciprocate said switch on said pivot at pre-determined intervals to cause intermittent contact under pre-determined conditions of pressure acting on the pressure responsive device.

11. In a pressure controlled switch, the combination of a circuit making and breaking switch having high and low pressure contacts, a pressure responsive device pivoted on said switch, a timing motor co-operating with said pressure device and arranged to reciprocate said switch on said pivot at pre-determined intervals to cause intermittent contact at either the high or low pressure position when the pressure on the pressure responsive device varies from normal.

12. A temperature control system of the class described comprising, in combination, an electrical temperature controlling apparatus, a thermosensitive element subjected to the temperature to be controlled, a switch controlled thereby, a circuit including said switch and in control of said temperature controlling apparatus, said switch having a neutral position in which the operation of the electrical temperature controlling apparatus is not effective and effective positions respectively above and below said neutral position adapted to control the rate of heat supply within the limits of operation of the electrical temperature controlling apparatus and a timing motor and means operated thereby, including a cam adapted to return said switch from either of its effective positions to its neutral position at predetermined intervals between the limits of operation of the electrical temperature controlling apparatus.

13. A temperature control system of the class described comprising, in combination, an electrical temperature controlling apparatus, a thermosensitive element subjected to the temperature to be controlled, a switch controlled thereby, a circuit including said switch and in control of said temperature controlling apparatus, said switch having a neutral position in which the operation of the electrical temperature controlling apparatus is not effective and closed circuit positions respectively above and below said neutral position adapted to control the starting, stopping and reversing of the electrical temperature controlling apparatus to thereby control the rate of heat supply and a timing motor and means operated thereby for returning said switch from either of its closed circuit positions to its neutral position at predetermined intervals between the limits of operation of the electrical temperature controlling apparatus to thereby effect a step by step control within said limits.

14. A temperature control system of the class described comprising, in combination, electrical operated apparatus for controlling a supply of heating media to the space to be heated, an electric circuit including a switch for controlling the operation of the electrical operated apparatus, means to control said switch including a device responsive to the temperature of the space to be heated and a device responsive to the condition of the heating media each cooperating with the other to control said switch, and means associated with said switch for rendering said electrical operated apparatus inoperative at predetermined periods and for variable length of time in accordance with variations in the temperature of the space to be heated.

15. In an apparatus for the regulation of a condition comprising, in combination, electrical operated means for controlling said condition, a device responsive to variations in said condition, a switch controlled thereby, a circuit including said switch and in control of said electrical operated means, said switch having a neutral position in which it is not effective in controlling the electrical operated means and effective positions respectively above and below said neutral position adapted to control the electrical operated means in either one or the opposite direction, and a timing motor and a cam operated by the timing motor adapted to return said switch from either of its effective positions to its neutral position at predetermined intervals between the limits of operation of the electrical operated means.

16. In a modulating system of temperature control comprising, in combination, an electrical temperature controlling apparatus, a thermostat subjected to the temperature to be controlled, a switch controlled thereby, a circuit including said switch and in control of the temperature controlling apparatus, said switch having a neutral position in which the operation of the electrical temperature controlling apparatus is not effective and contacting positions respectively above and below said neutral position adapted to control the rate of heat supply within the limits of operation of the electrical temperature controlling apparatus and timing motor and means operated thereby including a multiple step cam adapted to return said switch to its neutral position after each step of operation of the electrical temperature controlling apparatus.

17. A heat control system of the class described comprising, in combination, electrically operated valve for controlling steam supply to a space to be heated, an electric circuit including a switch for controlling the operation of the electrically operated valve, means to control said switch including a device responsive to the pressure of steam for heating said space, a thermostat responsive to the temperature of the space to be heated and a timing means, each cooperating with the other to control said switch, said switch having a neutral position in which the operation of the electrically operated valve is not effective and effective positions respectively above and below said neutral position adapted to control said valve in steps of operation in either of two directions as a function of the degree of operation of the thermostat and the pressure responsive device.

18. A heat control system comprising, in combination, electrically operated apparatus for controlling steam supply to a space to be heated, an electric circuit including a switch for controlling the operation of the electrically operated apparatus, means to control said switch including a device responsive to the pressure of steam for heating said space and a thermostat responsive to the temperature of the space to be heated, each cooperating with the other to control said switch to first limit the steam pressure for heating said space and then further reduce said pressure in accordance with the rise in temperature within the said space, said switch having a neutral position in which the operation of the electrical temperature controlling apparatus is not effective and effective positions respectively above and below said neutral position adapted to control the rate of steam supply as a function of the degree of operation of the pressure responsive device and said thermostat.

19. In a heat control apparatus comprising, in combination, a valve for controlling steam supply to a space to be heated, a control device adapted to control a source of power for operating said valve in either of two directions, said device having a neutral position in which it is not effective in operating said valve and effective positions respectively above and below said neutral position adapted to control said valve and its direction of operation, means to control said device including an element responsive to the pressure of steam for heating said space and a thermosensitive element responsive to the temperature of the space to be heated, means for interconnecting said elements including a floating lever and means connecting the last named means with the controlling device whereby said device and said valve are controlled as a function of the degree of operation of the thermosensitive element and the pressure responsive element.

JAMES L. KIMBALL.